(12) United States Patent
Santosstefano

(10) Patent No.: US 6,992,588 B1
(45) Date of Patent: Jan. 31, 2006

(54) ATTACHABLE ALARM SYSTEM FOR STROLLERS

(76) Inventor: Anthony Santosstefano, 411 Liberty Ave., Staten Island, NY (US) 10305

( * ) Notice: Subject to any disclaimer, the term of this patent is extended or adjusted under 35 U.S.C. 154(b) by 119 days.

(21) Appl. No.: 10/810,215

(22) Filed: Mar. 26, 2004

(51) Int. Cl.
*G08B 23/00* (2006.01)

(52) U.S. Cl. .............................. 340/573.1; 340/539.1; 340/539.15; 340/542; 340/568.1; 119/770; 119/792

(58) Field of Classification Search ............. 340/573.1, 340/573.4, 539.1, 539.15, 539.23, 542, 574, 340/568.1, 426.13, 539.11; 119/770, 792
See application file for complete search history.

(56) References Cited

U.S. PATENT DOCUMENTS

| | | | | |
|---|---|---|---|---|
| 4,888,580 A | * | 12/1989 | Distel | 340/573.1 |
| 5,345,221 A | * | 9/1994 | Pons et al. | 340/571 |
| 5,510,771 A | * | 4/1996 | Marshall | 340/573.4 |
| 5,617,074 A | | 4/1997 | White | 340/573 |
| 5,689,240 A | * | 11/1997 | Traxler | 340/573.4 |
| 5,848,576 A | * | 12/1998 | Colaianni | 119/770 |
| 5,933,083 A | * | 8/1999 | Sobczynski et al. | 340/573.4 |
| 5,936,529 A | * | 8/1999 | Reisman et al. | 340/573.1 |
| 5,936,530 A | | 8/1999 | Meinhold | 340/573.1 |
| 5,939,988 A | | 8/1999 | Neyhart | 340/573.4 |

* cited by examiner

*Primary Examiner*—Davetta W. Goins
(74) *Attorney, Agent, or Firm*—Goldstein Law Offices, P.C.

(57) ABSTRACT

An attachable alarm system for strollers for alerting parents and bystanders that a child is potentially being abducted. The system includes an alarm receiver having a housing, having an upper wall, and a speaker system for broadcasting an audible alarm. The alarm receiver includes a first reset mechanism and a second reset mechanism. A clamp mechanism extends upwardly from the upper wall of the housing of the alarm receiver. The clamp mechanism is fixedly securable to a handle of a baby stroller. A transmitter is in communication with the alarm receiver. The transmitter includes activation and deactivation buttons.

7 Claims, 2 Drawing Sheets

ATTACHABLE ALARM SYSTEM FOR STROLLERS

BACKGROUND OF THE INVENTION

The invention relates to an attachable alarm system for strollers for alerting parents and bystanders that a child is potentially being abducted.

Keeping their children safe from harm is one of the most paramount concerns of every parent. Whether it is openly discussing, calmly discouraging, or willfully forbidding such harmful acts as smoking, drug use, or unprotected sex, parents seek a myriad of ways to protect their kids in today's fast-paced world. While there are many potentially detrimental forces that can hurt children, parents feel confident that they have control over most of these. However, one of the greatest fears of every mother and father, and one which could render them helpless, is that their child will be lost or abducted. The Federal Bureau of Investigation estimates that more than 2,000 children are reported missing each day in the United States, adding up to nearly 750,000 children a year who run away from home or are the victims of a family or non-family abduction. Providing a visual to go along with these alarming statistics, bulletin boards in large shopping centers are virtually covered with missing children flyers and posters.

Parents are extremely diligent in maintaining a constant eye on their little ones while out in public. However, as it can be a bit difficult with curious small children and active toddlers, parents sometimes have to resort to constantly holding the child's hand, or tethering them to child leashes to keep them from scampering out of sight. Parents and caregivers with infants in strollers may feel a little safer, as these convenient carriages allow them to control their child's whereabouts. Unfortunately, there could come a time when even the protection of a stroller could prove to be no match for a would-be abductor. In a busy mall or crowded park, a parent could turn away only for a split second, giving a kidnapper enough time to snatch the stroller and run with it. What is needed is a device that will alert a parent or caregiver that someone is attempting to remove a child from their stroller.

The present invention attempts to solve the abovementioned problem by providing an attachable alarm system for strollers for alerting parents and bystanders that a child is potentially being abducted.

U.S. Pat. No. 5,617,074 to White discloses a child finder device comprised of a transmitter attached to a subject's body or concealed as jewelry. U.S. Pat. No. 5,939,988 to Neyhart discloses a child proximity sensor system that has a unit worn by a child and locked with a key, and a parents monitoring unit capable of providing audible and visible alerts. U.S. Pat. No. 5,939,530 to Meinhold discloses an additional child protection device comprised of an alarm unit that can be worn on the wrist or torso of the subject.

While these units may be suitable for the particular purpose employed, or for general use, they would not be as suitable for the purposes of the present invention as disclosed hereafter.

SUMMARY OF THE INVENTION

It is an object of the invention to produce an attachable alarm system for strollers for alerting parents and bystanders that a child is potentially being abducted.

The present invention is comprised of an alarm receiver disposed within a housing. The housing has an upper end, a lower end, a front wall, a back wall, and opposed side walls. The alarm receiver has a speaker system for broadcasting an audible alarm. The alarm receiver includes a first reset mechanism and a second reset mechanism. The first reset mechanism is comprised of a combination keypad disposed on the upper end of the housing. The second reset mechanism is comprised of a key receiving slot disposed on the upper end of the housing. The front wall of the housing has a window disposed therein. A clamp mechanism extends upwardly from the upper wall of the housing of the alarm receiver. The clamp mechanism is fixedly securable to a handle of a baby stroller. An ankle securement bracelet is provided that is adapted for securement around an ankle of a small child. The bracelet has a lock disposed thereon. The ankle securement bracelet has a chain extending outwardly therefrom with a free end thereof securing to a lower end of the housing of the alarm receiver. A transmitter is provided that is in communication with the alarm receiver. The transmitter includes activation and deactivation buttons. The transmitter includes a key portion. The key portion is receivable by the key receiving slot of the alarm receiver and the lock of the ankle securement bracelet.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
FIG. 1 is a perspective view of the present invention illustrated as secured to a stroller and child.

FIG. 1 illustrates an attachable alarm system for strollers for alerting parents and bystanders that a child is potentially being abducted. In its broadest context, the present invention is comprised of an alarm receiver, a clamp mechanism, an ankle securement bracelet, and a transmitter.

Figure 2:
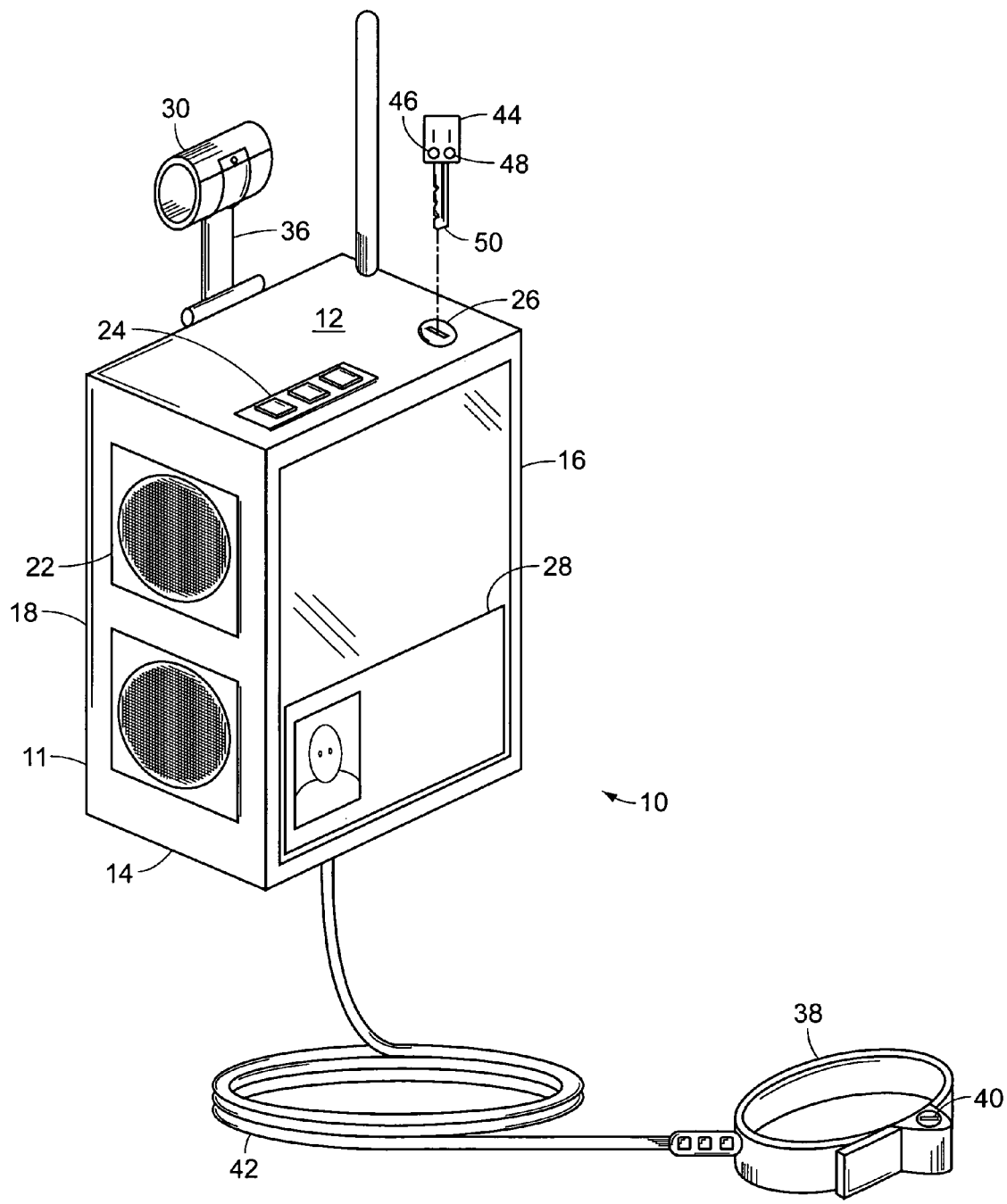
FIG. 2 is a perspective view of the present invention.

FIG. 2 illustrates the alarm receiver 10, which has a housing 11. The housing 11 has an upper end 12, a lower end 14, a front wall 16, a back wall 18, and opposed side walls 20. The alarm receiver 10 has a speaker system 22 for broadcasting an audible alarm. The speaker system 22 is disposed in one of the side walls 20 of the housing 11. The alarm receiver 10 includes a first reset mechanism 24 and a second reset mechanism 26. The first reset mechanism 24 is comprised of a combination keypad disposed on the upper end 12 of the housing 11. A preselected combination would be entered to reset the alarm receiver 10 once it has been activated. The second reset mechanism 26 is comprised of a key receiving slot disposed on the upper end 12 of the housing 11. The front wall 16 of the housing 11 has a window 28 disposed therein. The window 28 can be used to display a picture of a child.

The clamp mechanism 30 extends upwardly from the upper wall 12 of the housing 11 of the alarm receiver 10. The clamp mechanism 30 is fixedly securable to a handle 32 of a baby stroller 34. The clamp mechanism 30 will only be removable by its owner. The clamp mechanism 30 is secured to the housing 11 of the alarm receiver 10 by a swivel arm 36.

The ankle securement bracelet 38 is adapted for securement around an ankle of a small child. The bracelet 38 has a lock 40 disposed thereon. The bracelet 38 is adjustable so that it can be snugly secured to the small child's ankle to preclude unauthorized removal. The ankle securement bracelet 38 has a chain 42 extending outwardly therefrom with a free end thereof securing to the lower end 14 of the housing 11 of the alarm receiver 10.

The transmitter 44 is in communication with the alarm receiver 10. The transmitter 44 includes activation and deactivation buttons 46 and 48. The transmitter 44 includes a key portion 50. The key portion 50 is receivable by the key receiving slot 26 of the alarm receiver 10 and the lock 40 of the ankle securement bracelet 38.

FIG. 2 illustrates the alarm receiver 10 in use. A parent or caregiver would first secure the alarm receiver 10 to the baby stroller 34 utilizing the clamp mechanism 30. Next, the ankle securement bracelet 38 would be secured to the small child's ankle and adjusted for security and comfort. The parent would then activate the alarm receiver 10 utilizing the first or second reset mechanisms. If the parent notices that the stroller 34 has been removed, they can press the activation button on the transmitter to activate the alarm receiver 10.

In conclusion, herein is presented an attachable alarm system for strollers for alerting parents and bystanders that a child is potentially being abducted. The invention is illustrated by example in the drawing figures, and throughout the written description. It should be understood that numerous variations are possible, while adhering to the inventive concept. Such variations are contemplated as being a part of the present invention.

What is claimed is:

1. An attachable alarm system for strollers for alerting parents and bystanders that a child is potentially being abducted comprising, in combination:

an alarm receiver having a housing, the housing having an upper end, a lower end, a front wall, a back wall, and opposed side walls, the alarm receiver having a speaker system for broadcasting an audible alarm, the alarm receiver including a first reset mechanism and a second reset mechanism, the first reset mechanism being comprised of a combination keypad disposed on the upper end of the housing, the second reset mechanism being comprised of a key receiving slot disposed on the upper end of the housing, the front wall of the housing having a window disposed therein;

a clamp mechanism extending upwardly from the upper wall of the housing of the alarm receiver, the clamp mechanism being fixedly securable to a handle of a baby stroller;

an ankle securement bracelet adapted for securement around an ankle of a small child, the bracelet having a lock disposed thereon, the ankle securement bracelet having a chain extending outwardly therefrom with a free end thereof securing to a lower end of the housing of the alarm receiver; and a transmitter in communication with the alarm receiver, the transmitter including activation and deactivation buttons, the transmitter including a key portion, the key portion being receivable by the key receiving slot of the alarm receiver and the lock of the ankle securement bracelet.

2. An attachable alarm system for strollers for alerting parents and bystanders that a child is potentially being abducted comprising, in combination:

an alarm receiver disposed within a housing, the alarm receiver having a speaker system for broadcasting an audible alarm, the alarm receiver including a first reset mechanism and a second reset mechanism;

a clamp mechanism extending upwardly from the upper wall of the housing of the alarm receiver, the clamp mechanism being fixedly securable to a handle of a baby stroller; and a transmitter in communication with the alarm receiver, the transmitter including activation and deactivation buttons.

3. The attachable alarm system for strollers as set forth in claim 2 wherein the first reset mechanism of the alarm receiver is comprised of a combination keypad disposed on an upper end of the housing.

4. The attachable alarm system for strollers as set forth in claim 2 wherein the second reset mechanism of the alarm receiver is comprised of a key receiving slot disposed on an upper end of the housing.

5. The attachable alarm system for strollers as set forth in claim 2 wherein a front wall of the housing has a window disposed therein.

6. The attachable alarm system for strollers as set forth in claim 2 and further including an ankle securement bracelet adapted for securement around an ankle of a small child, the bracelet having a lock disposed thereon, the ankle securement bracelet having a chain extending outwardly therefrom with a free end thereof securing to a lower end of the housing of the alarm receiver.

7. The attachable alarm system for strollers as set forth in claim 6 wherein the transmitter includes a key portion, the key portion being receivable by the key receiving slot of the alarm receiver and the lock of the ankle securement bracelet.

* * * * *

UNITED STATES PATENT AND TRADEMARK OFFICE
CERTIFICATE OF CORRECTION

PATENT NO.        : 6,992,588 B1
APPLICATION NO.   : 10/810215
DATED             : January 31, 2006
INVENTOR(S)       : Anthony Santostefano It is certified that error appears in the above-identified patent and that said Letters Patent is hereby corrected as shown below:

Title Page #76 (col. 1 line 1)
The inventors name is spelled Anthony Santostefano. It is misspelled in his issued patent.

Change Inventor's name to read as above

Signed and Sealed this

Twenty-ninth Day of August, 2006

JON W. DUDAS
*Director of the United States Patent and Trademark Office*